3,267,214
TELEVISION RECEIVER

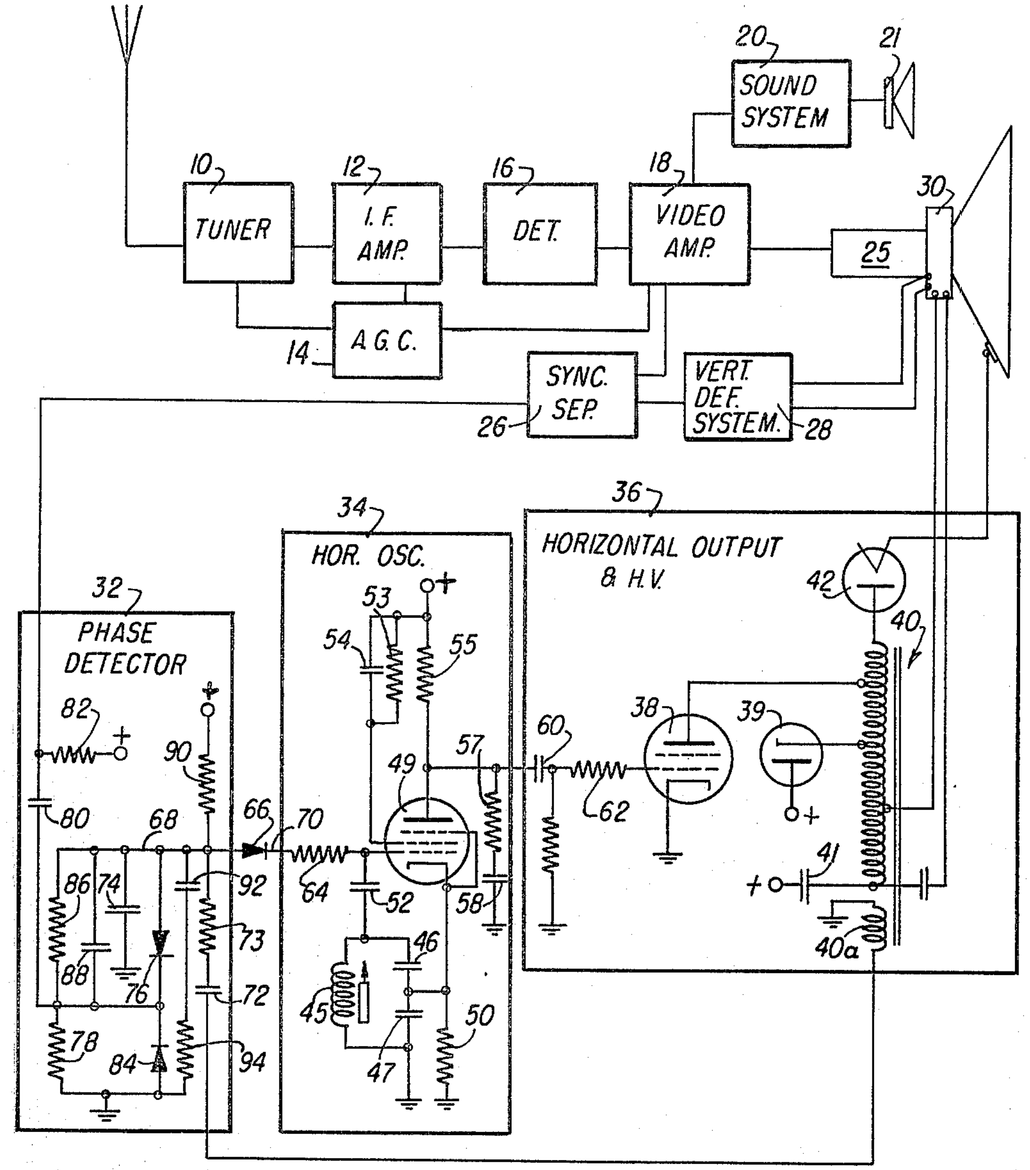
INVENTOR.
Eugene F. Sullivan
BY Mueller & Aichele
Attys.

Eugene F. Sullivan, Bensenville, Ill., assignor to Motorola, Inc., Chicago, Ill., a corporation of Illinois
Filed June 24, 1963, Ser. No. 289,976
5 Claims. (Cl. 178—69.5)

This invention relates to television receivers and more particularly to the deflection system of a television receiver.

In the design of present day television receivers the trend is to wider deflection angles which require greater deflection energy. At the same time, it is desirable to maintain good efficiency and simplified low cost construction of the receiver. One problem which may be experienced in pursuing these goals is horizontal sweep collapse due to the biasing off of the horizontal oscillator. This can be observed as a low frequency oscillation of the horizontal deflection system, with the picture alternately collapsing to a vertical line and expanding again to normal width.

This problem can arise due to a particular relation between the horizontal oscillator, which controls the horizontal sweep rate, and the phase detector which regulates the oscillator in view of the synchronizing components in the received signal and the actual deflection rate of the sweep system at any given time. For example, the oscillator may be controlled by the phase detector over a relatively large part of the transfer characteristic, that is, the signal handling capability, of the oscillator tube, as the phase detector develops a potential which is proportional to the time difference between the synchronizing components and the sweep signals. Then if spurious signals enter the phase detector so that it develops an even greater than usual voltage for control of the oscillator, the oscillator may be driven to a cutoff condition by the phase detector thus causing momentary loss of the entire horizontal sweep. It has been found that due to radiation of a high powered sweep circuit, enough radiated energy may be picked up by the RF circuit and fed to the phase detector in a manner that the phase detector senses a false error which is cumulative over several cycles causing repeated collapse and return to normal of the horizontal deflection system in what amounts to a low frequency oscillation of that system.

An object of this invention is to overcome the tendency for horizontal sweep collapse due to improper phase detector control of the horizontal oscillator.

Another object is to provide a simple and effective cure for false control of a deflection oscillator by a phase detector in an efficient television receiver having a high power sweep system.

In the drawing the figure is a diagram of a television receiver, partly in block and partly in schematic representation, to illustrate the invention.

In a specific form the invention is particularly useful in the horizontal deflection system of a television receiver which includes a horizontal oscillator, with free running capability, having a control electrode in an oscillator valve, the potential of which may be varied to adjust the oscillator frequency and thus the beam scanning rate. A phase detector is connected to be responsive to the separated sync pulses of a received signal as well as the actual sweep pulses developed for use in the receiver. When a timing error between these pulses exists, the phase detector provides a control potential to regulate the bias of the oscillator in a direction to tend to bring the sweep system into synchronism with the received sync pulses. This phase detector voltage is applied to the oscillator through a unidirectionally conductive device, such as a silicon diode, to limit the range of the control voltage which may be applied to the oscillator. A bias of the oscillator forms a bias for the unidirectional conductive device to establish a cutoff level for the conductive path provided therethrough from the phase detector to the oscillator. Thus, if the phase detector responds to spurious signal energy and thereby tends to produce an oscillator control voltage which might bias off the oscillator, the unidirectional conductive device is non-conductive and the oscillator will not be cutoff to avoid horizontal collapse of the reproduced picture.

The figure shows representative circuitry for a television receiver in which the invention may be incorporated. The tuner 10, which may include an RF amplifier and a suitable mixer and oscillator, provides a signal of fixed frequency for the intermediate frequency amplifier 12. Both tuner 10 and the IF amplifier 12 are controlled by a gain control potential from the AGC stage 14 in accordance with usual practice. The selected and amplified signal is applied to the detector 16 which is connected to the video amplifier stage 18. The FM sound subcarrier of the demodulated signal is applied to a sound system 20 wherein the audio signal is derived and amplified in order to drive loudspeaker 21.

The video amplifier 18 also supplies a signal level dependent control to the AGC system 14 and the video portion of the signal to the cathode ray tube 25. The video amplifier 18 is further connected to the synchronizing signal separator 26 which amplitudes separates the vertical and horizontal synchronizing components of the composite television signal after it is demodulated by the detector 16. The vertical synchronizing components at 60 cycles per second are applied to the vertical deflection system 28 which produces a suitable driving current for the deflection yoke 30 on the neck of the cathode ray tube 25.

The synchronizing signal separator 26 is also connected to the phase detector 32 which, as will be explained subsequently in detail, produces a direct current control voltage to properly synchronize the horizontal deflection system with respect to the received signal. The output of the phase detector 32 is applied to the horizontal oscillator 34 to provide a properly synchronized drive for the horizontal output stage 36.

In accordance with usual practice, the stage 36 includes a horizontal output tube 38 connected to a horizontal output transformer 40. The horizontal deflection windings of the yoke 30 are connected to the primary winding of the transformer 40 and the system with the damper diode 39 and bootstrap capacitor 41, is operative in a known manner to produce a substantially sawtooth current wave through the yoke 30 for proper beam deflection. Transformer 40 also includes a winding portion which is connected to the high voltage rectifier 42 in order to rectify the high voltage pulses produced in the transformer 40 to provide a direct current potential of the order of 20 kv. or more for the screen of the cathode ray tube 25.

Considering now the horizontal oscillator 34, the circuitry of that stage may be described as a modified Colpitts sine wave oscillator. This stage can be constructed to provide efficiency and simplicity while at the same time producing a sufficient drive voltage for the tube 38 to effect wide angle deflection in the picture tube 25.

Variable inductor 45 is connected in parallel with a series combination of the capacitors 46 and 47.The elements 45–47 form a resonant circuit which determines the free running frequency of the oscillator 34. Adjustment of inductor 45 forms a horizontal "hold" control and is thus the manual adjustment for setting of the oscillator frequency (15.75 kc.) with respect to the received signal and the condition of the receiver. The Colpitts oscillator circuit is evidenced by the connection of the cathode of the horizontal oscillator tube 49 to the junction of the tuning capacitors 46, 47. Thus, regenerative feedback is obtained in the cathode circuit across the cathode resistor 50 which is connected between the cathode and ground. Cathode bias is also developed across resistor 50. The top of the tuned circuit 45–47 is connected through capacitor 52 to the control grid of oscillator tube 49.

The screen grid of oscillator tube 49 is connected through a resistor 53 to the B+ supply and is bypassed by a condenser 54. The screen grid forms the output electrode of the sine wave oscillator and is electron coupled to the anode of tube 49, which is connected through the load resistor 55 to the B+ potential.

The oscillator tube 49 is conductive on the positive peaks of the grid waveform, due to the tuned circuit 45–47, resulting in voltage pulses at the screen grid. The voltage pulses thus coupled to the anode circuit of tube 49 are wave shaped by the series RC network 57, 58 which is connected from the anode to ground. The signal is then fed through the coupling capacitor 60 of the horizontal output stage 36 and the resistor 62 to the control grid of the horizontal output tube 38. The waveform at the control grid of tube 38 is of the usual sawtooth shape with sharp negative cutoff pulses occurring at the time of retrace of the beam.

It has been found that the horizontal output tube 49 can provide sufficient drive for the horizontal output tube 38 although it is necessary to supply a relatively large control voltage to the oscillator tube 49 in order to properly synchronize oscillator frequency with the received signal. The synchronization can be controlled directly at the control grid of tube 49 without the utilization of a reactance tube.

During the time of the positive tip of the sine wave at the control grid of tube 49, this grid will conduct and charge capacitor 52. The time constant of the capacitor 52 and the resistor 64 is such that the capacitor 52 will discharge during each cycle of the 15.75 kc. operation of the oscillator. The discharge path for capacitor 52 is through the resistor 64, the diode 66 and to the lead 68 which is established at a particular direct current potential as will be explained subsequently. There will, of course, be an average negative potential on the grid of tube 49 (with respect to ground) of the order of 6 volts or so to properly bias this oscillator tube.

The charging and discharging of capacitor 52 superimposes a sawtooth voltage on the control grid of the oscillator tube 49. Accordingly, the signal at this grid is a combination sawtooth and sine wave with the sawtooth wave steepening the leading slope of the sine wave tip in proportion to the amplitude of the sawtooth waveform. The greater the amplitude of the sawtooth, the faster the sine wave will rise to cause grid conduction and the sooner grid conduction will occur during any cycle and the greater will be the frequency of the oscillation.

Proper frequency of phase control of the oscillator 34 can be understood by considering that the application of a negative voltage to the lead 70, which is connected through resistor 64 to the control grid of tube 49, will decrease the amplitude of the sawtooth signal since there will be a reduced voltage difference across resistor 64 as the capacitor 52 begins to discharge during each cycle. Accordingly, the amplitude of the sawtooth waveform produced by capacitor 52 and resistor 64 will decrease and reduce the slope of the leading portion of the sine wave so that the oscillator tube 49 will conduct later in time, thereby lowering the frequency of oscillation.

On the contrary, when a positive potential is applied to lead 70, a larger voltage difference will be produced across resistor 64 as capacitor 52 begins to discharge thereby forming a sawtooth waveform of greater amplitude which makes the leading edge of the positive portion of the sine wave steeper in slope and allows the tube 49 to conduct sooner to increase the frequency of oscillation.

A description will now be given of the operation of the phase detector 32 in order to explain how a positive potential is produced on lead 68 in order to increase the oscillator frequency or a negative potential is produced to decrease the oscillator frequency so that the oscillator 34 is probably synchronized with the horizontal synchronization pulses of the composite video signal. The winding 40*a* of the horizontal output transformer 40 is connected to ground and through the blocking capacitor 72 and the resistor 73 to the lead 68. Positive pulses occurring during the retrace interval are developed in the winding 40*a* and are utilized in the phase detector 32 in order to compare the timing of these pulses with the received horizontal sync pulses. The retrace pulse from transformer 40*a* appears on lead 68 in integrated form so that lead 68 carries a sawtooth voltage determined by the horizontal sweep system of the receiver. A capacitor 74 connected between lead 68 and ground, together with resistor 73, perform the integration function to produce the sawtooth potential.

During the most positive portion of the sawtooth waveform on lead 68 the diode 76 will conduct from ground through resistor 78 thus making the top side of resistor 78 positive. A capacitor 80 is connected between the junction of resistor 78 and diode 76 in synchronizing signal separator 26. The top side of capacitor 80 is returned through a resistor 82 to a positive potential source so that capacitor 80 is effectively D.C. connected across the resistor 78. Accordingly, as diode 76 conducts during the positive portion of the sawtooth waveform on lead 68, the bottom side of capacitor 80 will assume a positive charge.

During the negative most portion of the sawtooth waveform on lead 68 the diode 84 will conduct from ground through the resistor 86 to lead 68. This will tend to establish a negative charge on the top of capacitor 88 which is connected across resistor 86. Resistors 78 and 86 are of equal value and the circuit is so adjusted that due to the sawtooth waveform by itself the charges on capacitors 80 and 88 will balance out to produce essentially at zero net potential between lead 68 and ground, that is, across capacitor 74.

The synchronizing signal separator circuit 26 provides negative going pulses in response to the horizontal sync pulses of the received signal and those are applied through capacitor 80 to the junction of the "cathode" electrodes of diodes 76 and 84. When the timing of the negative sync pulse is such that it occurs partly during the conduction of each of diodes 76 and 84, then the phase detector remains balanced and a net change in the detector output on lead 68 does not take place.

However, if the sync pulse is applied to the phase detector during the positive portion of the sawtooth waveform developed by the locally generated horizontal deflection system, it will be seen that the oscillator 34 is running fast and that a negative potential should be developed on lead 68 to be applied to the control grid of 49 for slightly lowering the frequency of oscillation. The phase detector becomes unbalanced to produce this net negative potential because the negative going sync pulse arrives during the conduction of diode 76 and the negative pulse reduces the net voltage across resistor 78 so that a less positive charge is produced on the bottom of the capacitor 80. Therefore, the negative charge on the top of capacitor 88 will predominate in the balancing process between the two charges on capacitors 80 and 88. Thus, a negative potential will be developed on lead 68.

If the sync pulse from the separator circuit 26 occurs during the negative portion of the sawtooth signal applied to the phase detector, then the bottom side of capacitor 80 will assume a greater than usual positive charge through the conduction of diode 84 so that the total of the charges on capacitors 80 and 88 will result in a net positive potential on lead 68.

A resistor 90 of large value is connected between lead 68 and a positive potential source in order to apply a small potential to this lead and balance out any net output from the phase detector due to noise fed thereto from the sync separator 26 during absence of a desired television signal. A series connected capacitor 92 and resistor 94 are connected between lead 68 and ground in order to form a filter circuit for the detector output. The network 92, 94 performs essentially an integrating function to damp the detector and keep it from hunting by slowing down its response time.

The diodes 66 connected between the output of the phase detector, namely lead 68, and the control grid of the oscillator tube 49, is poled to be conductive throughout the normal control voltage range from the phase detector 32. It will be noted that the bias on the grid of tube 49 may be of the order of minus 5 or 6 volts with respect to ground so that diode 66 will remain conductive until the phase detector output voltage falls below the potential at the control grid of tube 49. This functioning of the diode 66 is of particular importance in the circuit.

The horizontal oscillator circuit 34 may require a voltage swing of several volts to change the oscillator frequency of the order of ±300 cycles. A relatively large control voltage swing for the oscillator can be provided by using large sync pulses and horizontal feedback signals to the phase detector circuit 32. Furthermore, such a large oscillator correction swing may well operate the tube 49 over a large part of its transfer characteristic. If it should happen that the control potential from the phase detector 32 becomes so negative that it drives the control grid of tube 49 to cutoff, then there will be failure of the horizontal oscillator and collapse of the television image in the horizontal direction. This condition has sometimes been termed "horizontal flame-out."

Even though design precautions may be taken to insure that the normal output voltage from the phase detector 32 does not fall below the cutoff bias level of tube 49, such a condition may occur under certain adverse circumstances. For example, noise signals conducted from the receiver circuit and through the synch separator 26 to the phase detector may cause an unusually large negative potential to be falsely developed. Or, a condition may exist in which there is low frequency oscillation of the entire horizontal deflection system. For example, the high energy from horizontal retrace in the system 36 may develop pulse energy immediately following beam retrace which can be picked up by the receiver tuner, or otherwise coupled into the sensitive portions of the receiver, to be conducted through the sync separator 26 which may "recognize" such pulse energy as a normal signal sync pulse. Since this pulse signal would generally closely follow the normal sync pulse of a receiver, a false correction voltage would be produced thereby in the phase detector 32 which would tend to lower the frequency of oscillation of circuit 34 by the production of a negative phase detector control voltage. Since the false signal would always follow the production of the signals which are generated by the system, the error would be cumulative and would continue to reduce the oscillator frequency until the oscillator tube 49 were biased to cutoff. The system might then continue to oscillate between an on and off condition.

With the diode 66 connected between the output of the phase detector 32 and the control grid of the oscillator tube 49, any negative control voltage produced by the phase detector 32 which is below the bias voltage on the control grid of tube 49 will cause cutoff of the diode 66, and prevent cutoff of oscillator tube 49. This insures that the system will at least remain free running in the event that spurious signals do cause an unusually large negative control voltage in the output of the phase detector 32. Accordingly, the described system will provide the means for isolating the sine wave horizontal oscillator from its controlling phase detector circuit whenever the phase detector output reaches or exceeds a value which would overcome the oscillator bias as established in the grid circuit of tube 49.

I claim:

1. In a television receiver for utilizing a signal having video frequency components and synchronizing signal components, the combination of a deflection system to provide deflection signals for scanning a cathode ray beam, said deflection system including an oscillator operable to establish the frequency of the deflection signals, said oscillator including a bias circuit responsive to a variable voltage for regulating the frequency thereof throughout a control range, circuit means responsive to the synchronizing signal components of the television signal and to the deflection signals to produce a direct current potential proportional to the time difference between the synchronizing signal components and the deflection signals, and a unidirectionally conductive device series connected between said circuit means and said bias circuit to apply the direct current potential as the variable voltage to said oscillator, said device being poled to prevent a potential below the potential of the bias circuit from being applied to said bias circuit.

2. In a television receiver for utilizing a signal having video frequency components and vertical and horizontal synchronizing signal components, the combination of a deflection system to provide deflection signals for scanning a cathode ray beam, said deflection system including a sine wave oscillator operable to establish the frequency of the deflection signals, said oscillator having an amplifier device therein and a bias circuit for said device, said bias circuit being responsive to a variable voltage for regulating the frequency of said oscillator to control the frequency of the deflection signals, a phase detector controlled by the horizontal synchronizing signal components and the deflection signals to produce a direct current potential proportional to a time difference between such components and signals, and a diode series connected between said phase detector and said bias circuit so that the direct current potential from said phase detector is applied through said diode to said bias circuit as a variable voltage for regulating the frequency of said oscillator, said diode being poled to prevent the application of a disabling potential from said phase detector to said oscillator.

3. In a television receiver for utilizing a signal having video frequency components and vertical and horizontal synchronizing signal components, the combination of a deflection system to provide deflection signals for scanning a cathode ray beam, said deflection system including an oscillator operable to establish the frequency of the deflection signals, said oscillator having a pentode tube therein and circuit means connected to said tube to form a sine wave oscillator among the cathode and first and second grids thereof, said circuit means also including a bias circuit connected to the first grid and including a resistor-capacitor sawtooth forming network responsive to a variable voltage for regulating the frequency of said oscillator to control the frequency of the deflection signals, a phase detector controlled by the horizontal synchronizing signal components and the deflection signals to produce a direct current potential proportional to a time difference between such components and signals, and a diode series connected between said phase detector and said bias circuit so that the direct current potential from said phase detector is applied through said diode to said resistor-capacitor network as a variable voltage for regulating the frequency of said oscillator, said diode being poled to prevent the application of a disabling potential from said phase detector to said oscillator.

4. In a television receiver for utilizing a signal having video frequency components and synchronizing signal components, the combination of means for separating the synchronizing signal components from the television signal, a deflection system to provide deflection signals for scanning a cathode ray beam, said deflection system including an oscillator operable to establish the frequency of the deflection signals and including a tube having a grid circuit comprising means to establish a negative bias on said grid including a resistor-capacitor network direct current connected to said grid, with said capacitor charging and discharging on each cycle of the deflection signals and forming a sawtooth signal component at said grid, a phase detector system including means to produce a positive and negative control potential depending on the phase of the deflection signals compared to the synchronizing signal components, and a diode series connected between said phase detector and said resistor-capacitor network to apply the control potential to said oscillator as a frequency correcting voltage therefor, said diode being poled to prevent the application of a control potential to said grid which is below the cutoff level of said tube in said oscillator.

5. In a television receiver for utilizing a signal having video frequency components and synchronizing signal components, the combination of means for separating the synchronizing signal components from the television signal; a deflection system to provide deflection signals for scanning a cathode ray beam; said deflection system including a sine wave Colpitts oscillator operable to establish the frequency of the deflection signals; said oscillator including a tube having a grid to cathode circuit comprising means to establish a negative bias on said grid including a cathode bias resistor and a resistor-capacitor network direct current connected to said grid, with said capacitor charging and discharging on each cycle of the deflection signals and forming a sawtooth signal component at said grid; a phase detector system including means to produce a signal of sawtooth form in response to the deflection signals; said phase detector having a pair of diodes alternately conductive upon opposite peaks of the sawtooth waveform and further having means connected to the synchronizing signal separating means so that the phase detector provides a positive and negative direct current control potential depending on the phase of the sawtooth waveform compared to the synchronizing signal components; and a diode series connected between said phase detector and said resistor-capacitor network to apply the control potential to said oscillator as a frequency collecting voltage therefor, said diode being poled to prevent the application of a control potential to said grid which is below the cutoff level of said tube in said oscillator.

No references cited.

DAVID G. REDINBAUGH, *Primary Examiner.*

J. McHUGH, *Assistant Examiner.*